US010298768B2

(12) United States Patent
Gunther

(10) Patent No.: US 10,298,768 B2
(45) Date of Patent: *May 21, 2019

(54) VOICE AGENT FORWARDING

(71) Applicant: Harman International Industries, Incorporated, Stamford, CT (US)

(72) Inventor: Craig Gunther, Salt Lake City, UT (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/048,923

(22) Filed: Jul. 30, 2018

(65) Prior Publication Data

US 2018/0359364 A1 Dec. 13, 2018

Related U.S. Application Data

(63) Continuation of application No. 15/621,678, filed on Jun. 13, 2017, now Pat. No. 10,069,976.

(51) Int. Cl.
| | |
|---|---|
| *H04M 3/00* | (2006.01) |
| *H04M 5/00* | (2006.01) |
| *H04M 1/64* | (2006.01) |
| *H04M 3/523* | (2006.01) |
| *H04M 3/42* | (2006.01) |

(Continued)

(52) U.S. Cl.
CPC ........... *H04M 3/5237* (2013.01); *G10L 15/30* (2013.01); *G10L 21/06* (2013.01); *H04M 3/42* (2013.01); *H04M 3/5183* (2013.01); *H04M 3/5191* (2013.01); *G10L 15/22* (2013.01);
(Continued)

(58) Field of Classification Search
CPC ............. H04M 3/4936; H04M 3/5232; H04M 3/4931; H04M 3/51; H04M 3/5166
USPC ... 379/265.02, 265.01, 88.01, 88.02, 265.11, 379/265.05, 242
See application file for complete search history.

(56) References Cited

U.S. PATENT DOCUMENTS

| | | |
|---|---|---|
| 2008/0120104 A1 | 5/2008 | Ferrieux |
| 2017/0025124 A1 | 1/2017 | Mixter et al. |
| 2017/0351330 A1* | 12/2017 | Gordon ................... G06F 1/163 |

OTHER PUBLICATIONS

Network Time Protocol, Wikipedia Website, Available Online at https://en.wikipedia.org/wiki/Network_Time_Protocol, Website Available as Early as Mar. 13, 2004, Protocol Invented 1981, 9 pages.

(Continued)

*Primary Examiner* — Thjuan K Addy
(74) *Attorney, Agent, or Firm* — McCoy Russell LLP

(57) ABSTRACT

Examples include controlling voice input detection in a voice agent network including a plurality of voice agents. An example voice agent includes an audio sensor, a communication interface, a processor, and a memory device storing instructions executable by the processor to detect, via the audio sensor, audio data corresponding to a voice input, and responsive to determining that at least one other voice agent of a voice agent network is detecting audio data corresponding to the voice input determine a signal strength at which the audio data is detected, compare the signal strength to a reported signal strength from the at least one other voice agent, and selectively transmit one or more of an indication of the signal strength and the detected audio data based on comparing the signal strength to the reported signal strength from the at least one other voice agent.

20 Claims, 8 Drawing Sheets

(51) Int. Cl.
   *H04M 3/51*    (2006.01)
   *G10L 21/06*   (2013.01)
   *G10L 15/30*   (2013.01)
   G10L 25/51     (2013.01)
   G10L 15/22     (2006.01)
   G10L 25/21     (2013.01)
(52) U.S. Cl.
   CPC ............ *G10L 25/21* (2013.01); *G10L 25/51* (2013.01); *H04M 3/5166* (2013.01)

(56) References Cited

OTHER PUBLICATIONS

Stanton, K., "802.1AS Tutorial," IEEE Website, Available Online at http://www.ieee802.org/1/files/public/docs2008/as-kbstanton-8021AS-overview-for-dot11aa-1108.pdf, Nov. 13, 2008, 41 pages.
"Setem Technologies, Inc. Separating Voice from Noise," Setem Technologies, Inc. Website, Available Online at http://www.setemtech.com/, Available as Early as Jun. 22, 2012, 7 pages.
"Audyssey Unveils eVR: Enhanced Far Field Voice Recognition," Business Wire Website, Available Online at http://www.businesswire.com/news/home/20161122006049/en/Audyssey-Unveils-eVR-Enhanced-Field-Voice-Recognition, Nov. 22, 2016, 3 pages.
European Patent Office, Extended European Search Report Issued in Application No. 18172059.0, dated Sep. 3, 2018, Germany, 9 pages.

* cited by examiner

VOICE AGENT FORWARDING

CROSS REFERENCE TO RELATED APPLICATIONS

The present application is a continuation of U.S. Non-Provisional patent application Ser. No. 15/621,678 entitled "VOICE AGENT FORWARDING," and filed on Jun. 13, 2017. The entire contents of the above-identified application are hereby incorporated by reference in their entirety for all purposes.

FIELD

The disclosure relates to controlling voice data handling in networked voice controlled devices.

BACKGROUND

Voice controlled devices may perform various functions responsive to sensor data and/or in accordance with programmed responses to detected conditions. For example, voice controlled devices may serve as personal assistants and store data relating to one or more users in order to assist the one or more users with answering voice queries, controlling connected devices, managing calendars, notes, correspondences, etc., and/or otherwise responding to voice input from users.

In some examples, voice controlled devices are placed in a user's home, business, or other environment. An operating range of the voice controlled device (e.g., an area in which voice data may be detected by the voice controlled device) may be based on features of an integrated or otherwise associated microphone for that voice controlled device. Voice controlled devices may not have a range that is large enough to cover an entire house, building, or other environment, especially when taking into account obstacles, such as walls separating rooms, that further reduce an effective range of the device.

SUMMARY

In order to effectively extend a range of voice controlled devices, multiple devices may be deployed in a target environment. For example, in a house or other building with rooms, a voice controlled device may be positioned in each room and/or distributed around the environment in order to enable voice input to be detected throughout the environment. In such an example, each voice controlled device may serve as an individual voice agent of a voice agent network. Each voice agent in the voice agent network may be directly connected (e.g., without any intermediary devices) to at least one other voice agent and/or an associated network device, such that each voice agent of the voice agent network is connected to each other voice agent of the voice agent network either directly or indirectly (e.g., via one or more other voice agents and/or a network device).

As described above, each voice agent of a voice agent network may have an associated range in which voice data may be detected (e.g., by a microphone of that voice agent). A voice agent zone for a selected voice agent may thus be defined and/or bound by the range of the selected voice agent. In order to provide seamless coverage of a given environment, voice agent zones for a voice agent network may at least partially overlap. As a user moves through an environment in which a voice agent network is deployed, the user may traverse through different voice agent zones. Accordingly, if the user transitions from a first zone of a first voice agent to a second zone of a second voice agent while providing voice input (e.g., a voice query, voice command, etc.), the voice input may be detected in part by the first voice agent and in part by the second voice agent. As typical voice agents are operated individually, difficulties may arise in resolving voice input that is detected by more than one voice agent. The present disclosure provides systems and methods for controlling the forwarding of voice data and voice data handling between voice agents in order to avoid losses when a user transitions between voice agent zones.

Embodiments are disclosed for controlling voice input detection in a voice agent network including a plurality of voice agents. An example voice agent includes an audio sensor, a communication interface, a processor, and a memory device storing instructions executable by the processor to detect, via the audio sensor, first audio data corresponding to a voice input, and responsive to determining that at least one other voice agent of a voice agent network is detecting second audio data corresponding to the voice input, determine a signal strength at which the first audio data is detected, compare the signal strength to a reported signal strength of the second audio data as received from the at least one other voice agent, and selectively transmit one or more of an indication of the signal strength of the first audio data and the detected audio data based on comparing the signal strength of the first audio data to the reported signal strength of the second audio data as received from the at least one other voice agent.

An example method for controlling voice input detection in a voice agent network includes detecting, at a first voice agent, first audio data corresponding to a voice input at a first signal strength, responsive to determining that the first signal strength is higher than received signal strengths reported from each other voice agent in the voice agent network, assigning the first voice agent as a master voice agent, transmitting, from the first voice agent, a stream including the first audio data and a report of a continuously updated signal strength at which the first audio data is detected while the first voice agent is assigned as the master voice agent, and responsive to receiving an indication that a second voice agent in the network detects second audio data corresponding to the voice input at a signal strength that is higher than a currently-reported signal strength from the first voice agent, assigning the second voice agent as the master voice agent and stopping the transmission of the stream at the first voice agent.

An example voice agent network for controlling voice input detection includes a plurality of voice agents and a network device communicatively coupled to the plurality of voice agents and a query response server, a first voice agent of the plurality of voice agents including a memory device storing instructions executable by a processor of the first voice agent to detect first audio data corresponding to a voice input at a first signal strength, responsive to determining that the first signal strength is higher than received signal strengths reported from each other voice agent in the voice agent network, receive an assignment as a master voice agent, transmit a stream including the first audio data and a report of a continuously updated signal strength at which the first audio data is detected while the first voice agent is assigned as the master voice agent, and responsive to receiving an indication that a second voice agent of the plurality of voice agents detects second audio data corresponding to the voice input at a signal strength that is higher than a currently-reported signal strength from the first voice agent, assigning the second voice agent as the master voice agent and stopping the transmission of the stream at the first voice agent.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
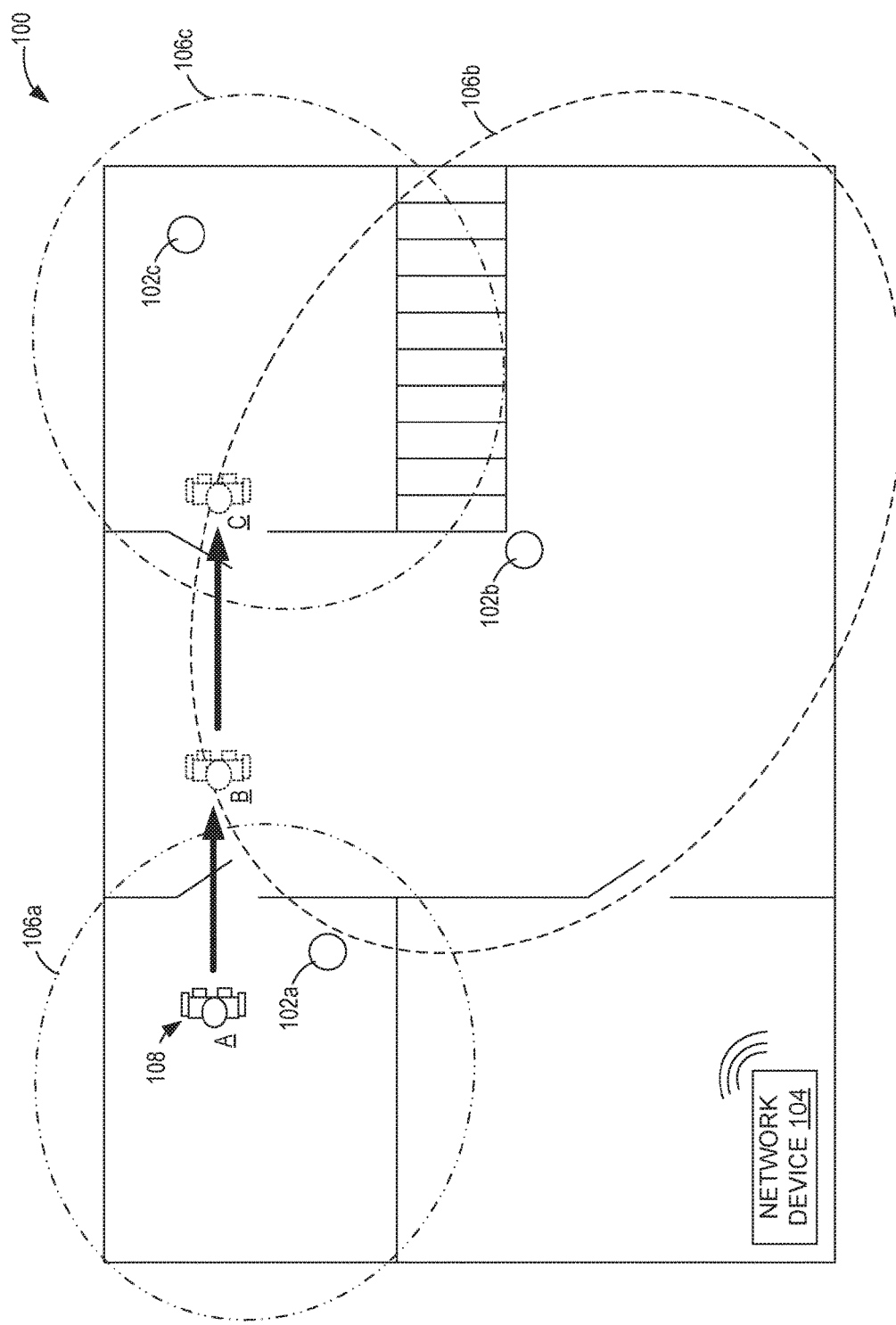
FIG. 1 shows an example environment for deploying voice agents in accordance with one or more embodiments of the present disclosure.

A voice agent may include any voice controlled and/or voice responsive device that detects voice input and performs an action responsive to the voice input. For example, a voice agent may detect (e.g., via an integrated or otherwise associated microphone) a voice input, which may include a voice query (e.g., "What is the weather today"), a voice memo (e.g., "Remember to buy milk"), a voice command (e.g., "Turn on lights"), and/or other voice data. In examples where multiple voice agents are distributed across an environment, a user may begin providing voice input (e.g., start a voice input string) that is detected by a first voice agent. As the user moves through the environment, however, different voice agents may detect different portions of the voice input (e.g., later portions of the voice input string). Adding further complications, some voice agents in an environment may have overlapping ranges, such that a portion of a voice input is detected by multiple voice agents. Upon completion of a voice input (e.g., completion of a voice query), the voice data collected by the multiple voice agents may be aggregated and analyzed to parse the voice data and provide an associated response or perform an associated action. In many examples, the processing described above may be performed off-board (e.g., at a remote server(s)) or at least on only one of the voice agents. Accordingly, in some systems, each voice agent may send all detected voice data to the processing device (e.g., the remote server(s) and/or the designated voice agent).

In order to decrease the processing load and bandwidth resources utilized during voice data processing, the disclosure provides systems and methods for controlling voice agents in a voice agent network such that only a single voice agent (e.g., a master voice agent) is responsible for forwarding voice data to a network and/or voice processing device at a given time. In particular, the disclosure provides for a voice agent network in which a voice agent is selected to be a master voice agent based on a signal strength of detected voice data, and in which the master voice agent forwards control (e.g., assigns another voice agent to be the master voice agent) responsive to determining that the other voice agent is detecting voice data at a higher signal strength than the current master voice agent. In this way, only the master voice agent forwards voice data to a voice data processing device, and the other voice agents transmit indicators of signal strength of detected voice data and do not transmit detected voice data (or transmit less of the detected voice data than the master voice agent).

Furthermore, voice agents may be configured to only start listening for voice data upon detection of a wake word (e.g., a particular voice data string, which may be a word, phrase, tone, or other predefined sound). Accordingly, the voice agents that detect the wake word may identify a voice fingerprint for the associated detected voice data and share this voice fingerprint with other voice agents. In this way, voice data that is detected by each agent may be associated with an identified user corresponding to the voice fingerprint in order to maintain correlation of voice data with a given user during master voice agent hand-off. The above-described features and others will be described in more detail below.

FIG. 1 schematically shows an example environment 100 including a voice agent network. In particular, the voice agent network of the illustrated example includes voice agents 102a, 102b, and 102c. In other examples, a voice agent network may include any number of voice agents. Each of the voice agents may communicate (e.g., via a wireless or wired connection) with one another directly and/or via a network device 104. The network device 104 may include a router or other intermediary networking device, which may also connect the voice agents to a remote computing device for performing additional processing (e.g., as described below with respect to the query response server of FIG. 4). In some examples, a remote computing device that performs additional processing may be outside of the environment of the voice agent network (e.g., outside of a building in which the voice agents are positioned, as with a remote server or distribution of servers) or in the voice agent network environment (e.g., within a building in which the voice agents are positioned, as with a mobile device or desktop computing device).

Each voice agent may have an associated range of operation, which is sized and shaped based on characteristics of a microphone or other audio sensor of the voice agent, as well as obstacles in the environment 100. For example, voice agent 102a has an associated range of operation 106a, voice agent 102b has an associated range of operation 106b, and voice agent 106c has an associated range of operation 106c. In the illustrated example, the range of operation 106b is larger than ranges of operation 106a and 106c due to the more open region in which voice agent 102b is located. In other examples, a range of operation for each voice agent of a voice agent network may be equal to one another.

As a user 108 moves through environment 100, a user 108 may transition from one range of operation to another. Any voice input provided by the user 108 is detected by the voice agent(s) associated with the range(s) of operation in which the user is located. As shown in FIG. 1, some of the ranges of operation overlap with one another. Accordingly, the user may, at some points in time, be located within ranges of operation for two different voice agents. For example, at position A, the user 108 is located only in the range of operation 106a for voice agent 102a. However, at position B, the user transitions from range of operation 106a to range of operation 106b (for voice agent 102b). Finally, at position C, the user transitions from range of operation 106b to range of operation 106c (for voice agent 102c).

Accordingly, in the example illustrated in FIG. 1, if the user 108 provides a voice input string that begins while the user is in position A and then continues as the user moves to position B and then position C, portions of the voice input may be detected by different voice agents over the course of providing the full voice input string. An example hand-off of voice agent control during such a transition is described below in FIGS. 2A and 2B.

Figure 2A:
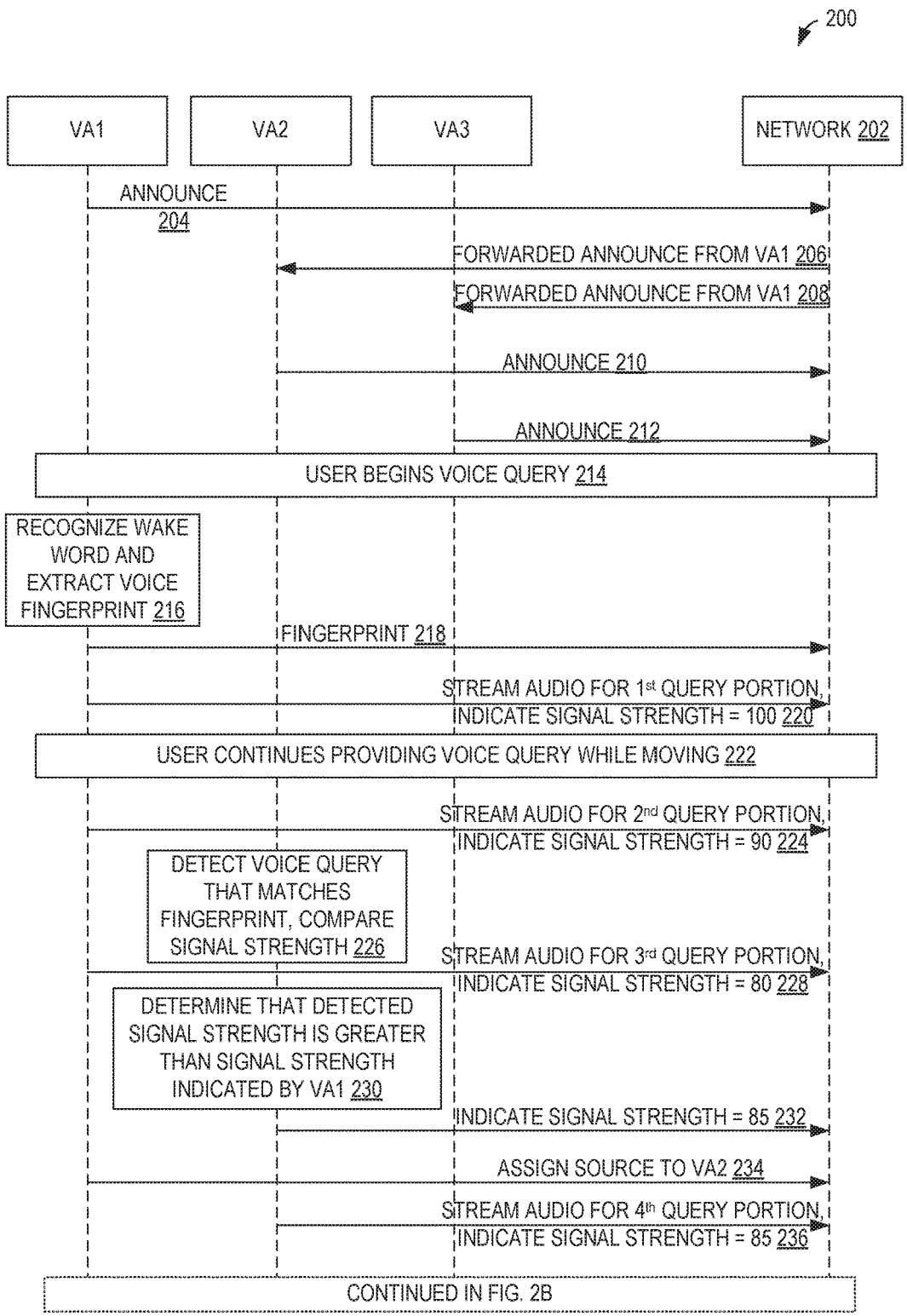
FIGS. 2A and 2B show an example communication diagram of voice data and control message forwarding in a voice agent network in accordance with one or more embodiments of the present disclosure.
Figure 2B:
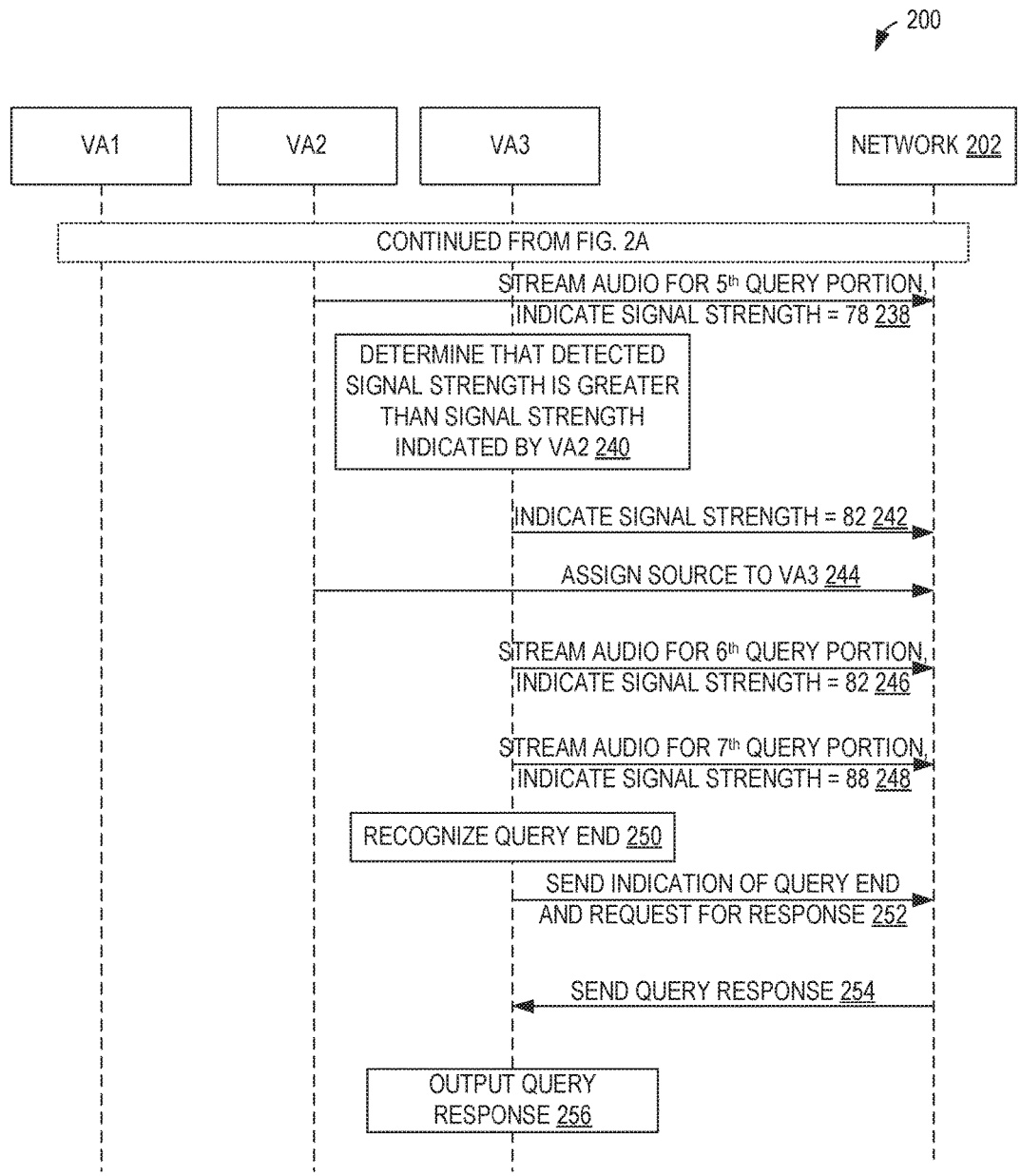

FIGS. 2A and 2B show a communication diagram 200 for data transfer between voice agents and a network device in a voice agent network. In the example of FIGS. 2A and 2B, three voice agents are provided, VA1 (which may be an example of voice agent 102a of FIG. 1), VA2 (which may be an example of voice agent 102b of FIG. 1), and VA3 (which may be an example of voice agent 102c of FIG. 1). However, it is to be understood that more or fewer voice agents may be included in a voice agent network and may exchange similar messages to those discussed with respect to FIGS. 2A and 2B. The voice agents are shown as communicating to a network device 202, which may be an example of network device 104 of FIG. 1 and/or a remote server or cloud computing device.

In order to build and maintain a map of devices in the voice agent network, each voice agent may transmit an ANNOUNCE message identifying the voice agent upon entering the voice agent network. As shown at 204, an ANNOUNCE message is transmitted from VA1 to the network device 202 when VA1 joins the network. In other examples, the ANNOUNCE messages may be sent from voice agents periodically (e.g., at regular predefined intervals and/or responsive to a different trigger such as a change in configuration or other parameter of the network). In some examples, the transmission of an ANNOUNCE message from one voice agent may trigger transmission of ANNOUNCE messages from each other voice agent in the voice agent network. At 206 and 208, the ANNOUNCE message from VA1 is forwarded to VA2 and VA3, respectively, from the network device 202. At 210 and 212, VA2 and VA3 send respective ANNOUNCE messages to the network device 202. Although not shown for purposes of clarity, it is to be understood that the network device 202 may also forward the ANNOUNCE message from VA2 to VA1 and VA3 and may forward the ANNOUNCE message from VA3 to VA1 and VA2 responsive to receiving the respective ANNOUNCE messages.

At 214, a user (e.g., user 108 of FIG. 1) begins a voice query. For the purposes of concise disclosure, the examples described herein that relate to voice queries are correspondingly applicable to any other voice input (e.g., voice memos, voice commands, etc.). As described above, voice agents may be configured to start listening for voice input responsive to detecting a predefined wake word. For example, the voice agents may employ a simplified speech detection algorithm that is only capable of identifying the wake word (or is only capable of identifying a small number of command terms including the wake word). Prior to detecting the wake word, the voice agents may detect voice data in a passive and/or fluid manner (e.g., not performing any processing on the voice data other than to determine whether the voice data includes the wake word, not storing the voice data, not transmitting the voice data, etc.) until the wake word is detected, at which point the voice agents actively listen and process and/or transmit detected voice data. In this way, the wake word may act as an interrupt signal that wakes the voice agents from a passive (e.g., sleep or low power) state and transitions the voice agents to an active listening state.

Accordingly, the voice query started at 214 may include a wake word associated with the voice agent network, followed by one or more portions of the voice query (e.g., a voice string including a question to be answered by the voice agent network). For illustrative purposes, the wake word in this example is the voice string "Hey agent" and the voice query in this example is "What is the forecast for today?" Accordingly, at 214, the user may begin the voice query by stating "Hey agent, what . . . " or some other portion of the voice query.

At 216, VA1 recognizes the wake word and extracts a voice fingerprint from the voice data. Using environment 100 of FIG. 1 as an illustrative example, the user providing the voice query may be located at position A, within range of the voice agent 102a, while vocalizing the wake word and first part of the voice query. The voice fingerprint may include identifiers or sound markers that are associated with the user providing the voice query, which may enable other voice agents to associate voice input having the same voice fingerprint with the voice input detected at VA1. Accordingly, at 218, VA1 transmits the voice fingerprint to the network device 202 for distribution throughout the voice agent network. For example, although not shown for purposes of clarity, the voice fingerprint transmitted at 218 and/or any other data transmitted to the network device 202 may be forwarded from the network device 202 to VA2 and/or VA3 (e.g., for storage at VA2 and VA3). At 220, VA1 streams audio (e.g., the voice data, which may include raw and/or digitized voice data detected by an audio sensor of VA1) for a first query portion to at least the network device 202, along with an indication of a signal strength at which that query portion was detected (e.g., 100 in this example). In some examples, the network device 202 may forward one or both of the audio and the indication of the signal strength to each other voice agent (or each other voice agent that is currently detecting voice data for the same voice input) in the voice agent network. In additional or alternative examples, the network device 202 may forward the audio to a remote computing device, such as a query response server. In further additional or alternative examples, where one or more voice agents are directly connected to the master voice agent (e.g., without an intermediary network device), one or both of the audio and the indication of the signal strength may be sent directly to the one or more voice agents (e.g., cabling or other connectivity between the voice agents may be used in place of a physical networking device). In this way, audio and/or signal strength data may be shared amongst voice agents in the voice agent network, where only a single voice agent is transmitting audio data for a voice input/voice query at a given time.

The signal strength may be an absolute value (e.g., a decibel value indicating an average or other calculated decibel level at which the voice data is detected) or a functional value (e.g., a percentage or range representing different levels of estimated signal quality). In some examples, a signal to noise ratio (SNR) measurement may indicate and/or be used to determine a signal strength at which voice data is detected. In any case, relative signal strengths of voice data detected by each voice agent (e.g., each voice agent that is detecting voice data having the same voice fingerprint) may be compared to one another to determine which voice agent is to be designated the master voice agent (e.g., which voice agent is to stream audio to the network including the detected voice data). In additional or alternative examples, a signal quality measurement may be used instead of or in combination with the signal strength measurement in order to determine which voice agent is to be designated the master voice agent (e.g., where a voice agent receiving voice data with a highest quality is designated a master voice agent). The signal quality measurement may be derived from measurements of one or more of an SNR (e.g., where quality increases with increasing SNR), an amount of echo and/or reflections (e.g., where quality decreases with increasing echo and/or reflections), an amount of distortion (e.g., where quality decreases with increasing distortion), an amount or rate of dropped voice data (e.g., where quality decreases with increasing dropped data amounts or rates), etc. It is to be understood that the examples described herein relating to signal strength may be adjusted to utilize signal quality in addition to or in place of signal strength without departing from the scope of this disclosure.

At 222, the user continues providing the voice query while moving. For example, the user may be moving between positions A and B in FIG. 1 while continuing with the next word of the query (e.g., "is"). As the user may still be within the range of operation for VA1, but moving toward an edge of the range, the signal strength may decrease while providing the voice query. For example, VA1 may detect the first portion of the voice query at a higher decibel level than the second portion of the voice query since the user is moving farther from the microphone of VA1. Although described in terms of "portions" for illustrative purposes, it is to be understood that the master voice agent may continuously stream voice data and associated signal strengths as the voice data is detected and/or in chunks delineated based on networking resources available to the master voice agent. Accordingly, at 224, VA1 may report that the signal strength at which the second query is detected is lower (e.g., 90 in this example). However, since no other voice agents have reported detecting the voice query, VA1 continues to stream the audio (e.g., including the second portion of the voice query, e.g., "is") at 224 as well.

At 226, VA2 detects voice data corresponding to the voice query (e.g., VA2 may detect the "is" portion of the voice query). VA2 may extract a voice fingerprint from the detected voice data in order to determine or confirm that the voice data is part of the voice query being streamed by VA1 (e.g., determine that the extracted voice fingerprint matches the voice fingerprint reported by VA1 at least within a threshold amount of overlap). For example, at 226, the user may have just entered the operating range of VA2 (e.g., partially between positions A and B in FIG. 1). However, since the user is still closer to VA1 than VA2, the signal strength of the detected voice data at VA2 may be lower than that of VA1. VA2 may compare the signal strength of the voice data detected to the signal strength reported by VA1 and determine that VA1 is detecting the voice data at a higher signal strength. Accordingly, VA2 may not transmit the signal strength of the detected voice data. In other examples, VA2 may transmit the signal strength of the detected voice data, but hand-off may still not occur since the signal strength at VA2 is lower than the signal strength at VA1.

At 228, VA1 continues streaming audio corresponding to a third portion of the voice query (e.g., "the") and indicates that the signal strength is decreasing (e.g., that the signal strength is 80). At 230, VA2 determines that the signal strength at which VA2 is detecting the voice query is higher than the reported signal strength from VA1 (e.g., higher than 80). Accordingly, at 232, VA2 transmits an indication of the signal strength at which VA2 is detecting the voice query (e.g., 85). Since the reported signal strength of VA2 is greater than that of VA1, VA1 hands off control of the voice query detection to VA2 by assigning the source of detected voice data to VA2 at 234. In this way, the master voice agent switches or hands off from VA1 to VA2.

It is to be understood that hand-off may occur responsive to the signal strength of a non-master voice agent being greater than the signal strength of the master voice agent by a threshold in some examples. As a non-limiting example, the hand-off may not occur until a non-master voice agent detects a signal strength that is five points or decibel levels above the signal strength reported by the master voice agent, such that hand-off does not occur when the non-master voice agent detects a signal strength that is above the signal strength reported by the master voice agent by less than five points or decibel levels. The threshold may be based on a number of voice agents in the network, an arrangement of voice agents in the network, a size of an operating range of the voice agents in the network, and/or any other suitable parameter or combination of parameters. In additional or alternative examples, in order to provide a smooth transition, hand-off may occur upon determining that a non-master voice agent detects a signal strength that is greater than (and/or greater than by a threshold) the signal strength reported by the master voice agent for at least predetermined period of time. In still other additional or alternative examples, hand-off may only occur if a non-master voice agent detects a signal strength that is both higher than the signal strength reported by the master voice agent and higher than a predetermined minimum signal strength.

At 236, VA2 begins streaming audio for a fourth query portion (e.g., "fore") and transmits the signal strength at which the voice data is detected at VA2 (e.g., 85). As VA1 has handed off control of the voice detection prior to this time, VA1 may stop streaming audio and may not transmit any of the fourth query portion. In other examples, however, VA1 may transmit a threshold amount of data or for a threshold amount of time after handing off control (e.g., after VA2 starts streaming audio) in order to provide an overlap for stitching the voice data from the multiple sources together upon completion of the voice query.

The communication diagram 200 continues on FIG. 2B, where VA2 continues streaming audio for a fifth query portion (e.g., "cast") and indicates an associated signal strength at 238. However, the user may be moving toward an edge of the operating range of VA2 while providing the voice query (e.g., moving from position B to position C in FIG. 1), thus the reported signal strength may decrease (e.g., to 78). At 240, VA3 may determine that VA3 is detecting the voice query (e.g., as identified by the voice fingerprint) at a signal strength that is greater than the last reported signal strength of VA2 (e.g., the user may have moved into position C of the example of FIG. 1). Accordingly, VA3 may indicate a signal strength at which VA3 is detecting the voice query (e.g., 82) at 242. At 244, responsive to the determination that the signal strength reported by VA3 is greater than the signal strength at which VA2 is detecting the voice query, VA2 hands off control of the voice query detection by assigning the source of voice data to VA3, thereby designating VA3 as the new master voice agent. Accordingly, the next query portions (sixth and seventh, e.g., "for" and "today") and associated signal strengths (e.g., 82 and 88) are streamed and reported at 246 and 248, respectively.

At 250, VA3 recognizes an indication of a query end (e.g., a voice inflection indicating a question, a pause in voice data that is greater than a threshold, a key word, etc.). Responsive to detecting the query end, VA3 sends an indication of the query end to the network device 202 along with a request for a response to the query at 252. In some examples, the network device may forward the indication of the query end to the other voice agents, such that the other voice agents stop listening for voice data, and/or discard an association of the voice fingerprint of the voice query to a current voice query (e.g., so that any subsequently detected voice data is associated with a different voice query). The network device may not forward the request for response to the other voice agents, but may forward the request for response to a query response server or other remote or local device that is configured to parse voice queries and/or provide responses to parsed voice queries.

At 254, the network device 202 sends a query response to VA3. The query response may be received at the network device 202 from a query response server or other device for providing responses to voice queries in some examples. In other examples, the network device may include processing elements to parse voice queries and/or generate voice query responses, in which case the query response is generated locally. At 256, the last master voice agent (e.g., VA3, the voice agent that recognized the query end) outputs the query response (e.g., via a speaker, display, and/or other output device integrated in and/or associated with VA3).

Figure 3:
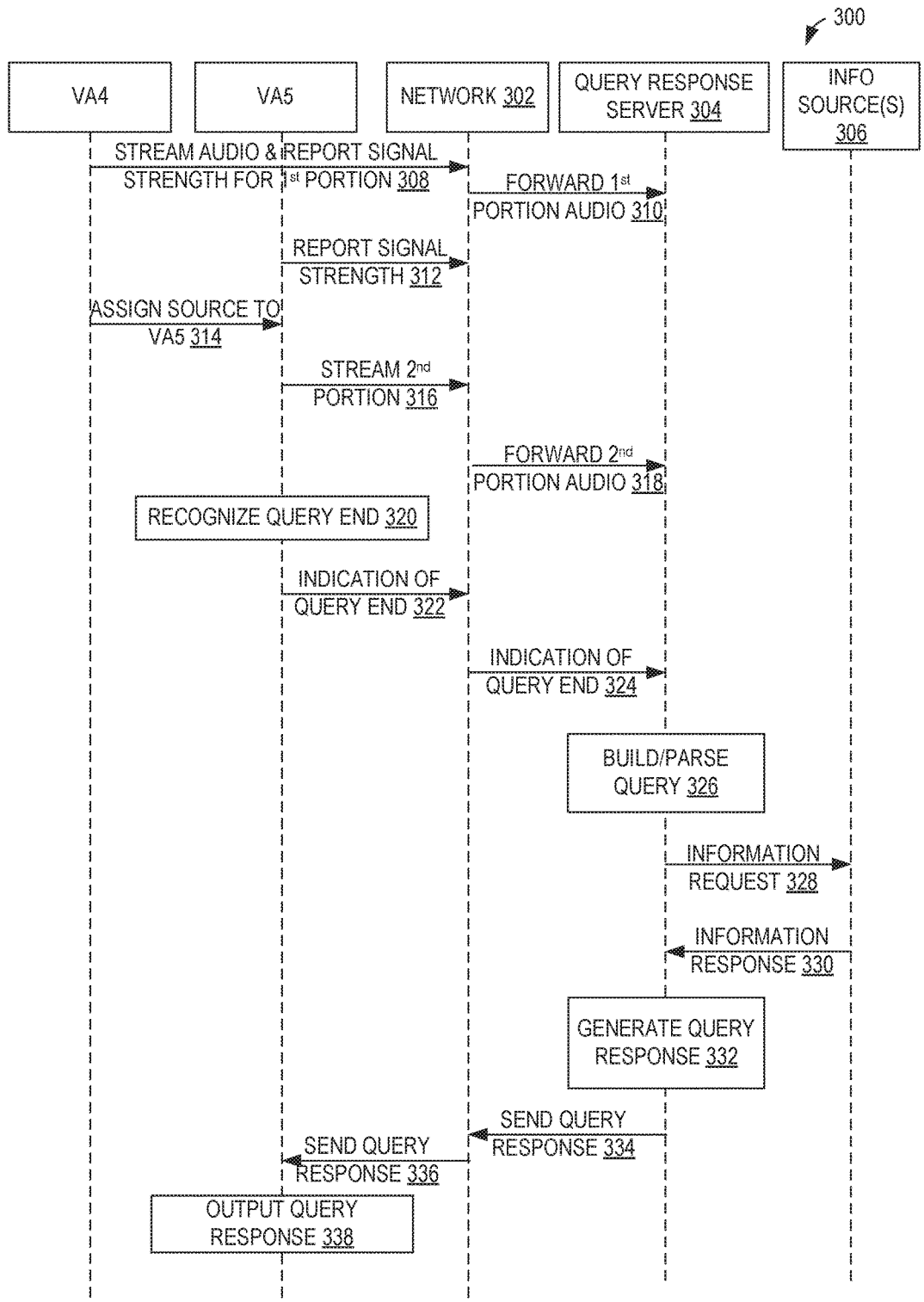
FIG. 3 shows an example communication diagram for rebuilding a voice query and generating a voice query response in accordance with one or more embodiments of the present disclosure.

FIG. 3 is a communication diagram 300 illustrating example communications between a voice agent network and a query response server in order to generate responses to voice queries. The voice agent network is a simplified version of the voice agent networks described above, and includes VA4, VA5, and network device 302. VA4 and VA5 may be examples of any of the above-described voice agents, and network device 302 may be an example of network device 104 of FIG. 1 and/or network device 202 of FIGS. 2A and 2B. Query response server 304 may be communicatively connected to VA4 and VA5 through network device 302. Query response server 304 may include processing elements to rebuild and parse a voice query from voice data received from multiple sources (e.g., multiple voice agents). Query response server 304 may also include processing elements for generating a request for information to form a response to a parsed voice query and for generating a query response based on received information. The information used to generate the query response may be received from one or more information sources 306. For example, an information source used to fulfill the example voice query described above with respect to FIGS. 2A and 2B may be a source of weather information. In other examples, information sources may include user profiles/social networking services, media storage devices, internet search engines, etc.

At 308, VA4 streams audio for a first detected portion of a voice query and an associated signal strength to network device 302. For purposes of clarity, some details of communication that were described above in FIGS. 2A and 2B may be omitted from the communication diagram 300. However, it is to be understood that such communications may still occur. For example, VA4 may have previously negotiated to be a first master voice agent and may send a voice fingerprint upon detection of the voice query as described above. Continuing at 310, network device 302 forwards the received voice data for the first portion of the voice query to the query response server 304. In other examples, the network device may additionally or alternatively aggregate voice data and may not transmit the voice data to the query response server until a query end is indicated by a voice agent. However, in the illustrated example, the network continuously forwards the voice data from the current master voice agent to the query response server in substantially real time as the data is received from the master voice agent.

At 312, VA5 detects the voice query and reports a signal strength that is greater than the signal strength last reported by VA4. Accordingly, at 314, VA4 assigns the source of the voice data to VA5, thereby handing over master status to VA5. At 316, VA5 streams a second portion of the voice query to the network device 302 along with an indication of signal strength. At 318, the network device forwards the voice data from VA5 (e.g., the second portion of the voice query) to the query response server 304.

At 320, VA5 recognizes a query end (e.g., as described above at 250 of FIG. 2B). Accordingly, at 322, VA5 sends an indication of the query end and a request for a query response to the network device 302. The network device 302 forwards the request for a query response to query response server 304 at 324. At 326, the query response server 304 builds and/or parses the voice query using the data received from VA4 and VA5. In some examples, query response server 304 may continuously build the query as data is received from network device 302. In other examples, the query response server may wait until the query end has been detected in order to process all of the received data at once and build the query therefrom. Building the query may include stitching together voice data from the multiple voice agents and performing speech recognition to determine a content of the query (e.g., to determine what information is requested by the query). The disclosed control over the streaming of voice data for the voice query has the technical effect of reducing the bandwidth load on the voice agent network and reducing the processing load on the query response server relative to other systems, as voice data is substantially received from only one voice agent at a time. In contrast, in other systems, each voice agent that detects the voice query may continuously send the detected voice data, thereby flooding the query response server with voice data that is to be analyzed to rebuild the voice query.

At 328, the query response server may send a request for information to one or more information sources 306 to fulfill the voice query (e.g., request weather information for the exemplary voice query described with respect to FIGS. 2A and 2B). At 330, the requested information may be received from the information source(s) 306. It is to be understood that in some examples, information to fulfill the voice query (e.g., to respond to a question posed by the voice query) may be stored locally at the query response server, in which case the request for information and subsequent receipt of information from the information sources may not be performed. At 332, the query response server generates a query response including the requested information (and/or local information for responding to the query). In some examples, the query response server may build a query response including placeholders for information (e.g., "the current forecast for today is [forecast]", where [forecast] is a placeholder tag identifying the type of information that is to be inserted into the response upon receipt from the information sources). The placeholders may be filled using local data and/or data from one or more of the information sources 306.

At 334, the generated query response is sent to the network device 302, which forwards the query response to the last master voice agent (e.g., VA5) at 336. At 338, the last master voice agent (e.g., VA5) outputs the query response (e.g., via a speaker, display, or other output device).

Figure 4:
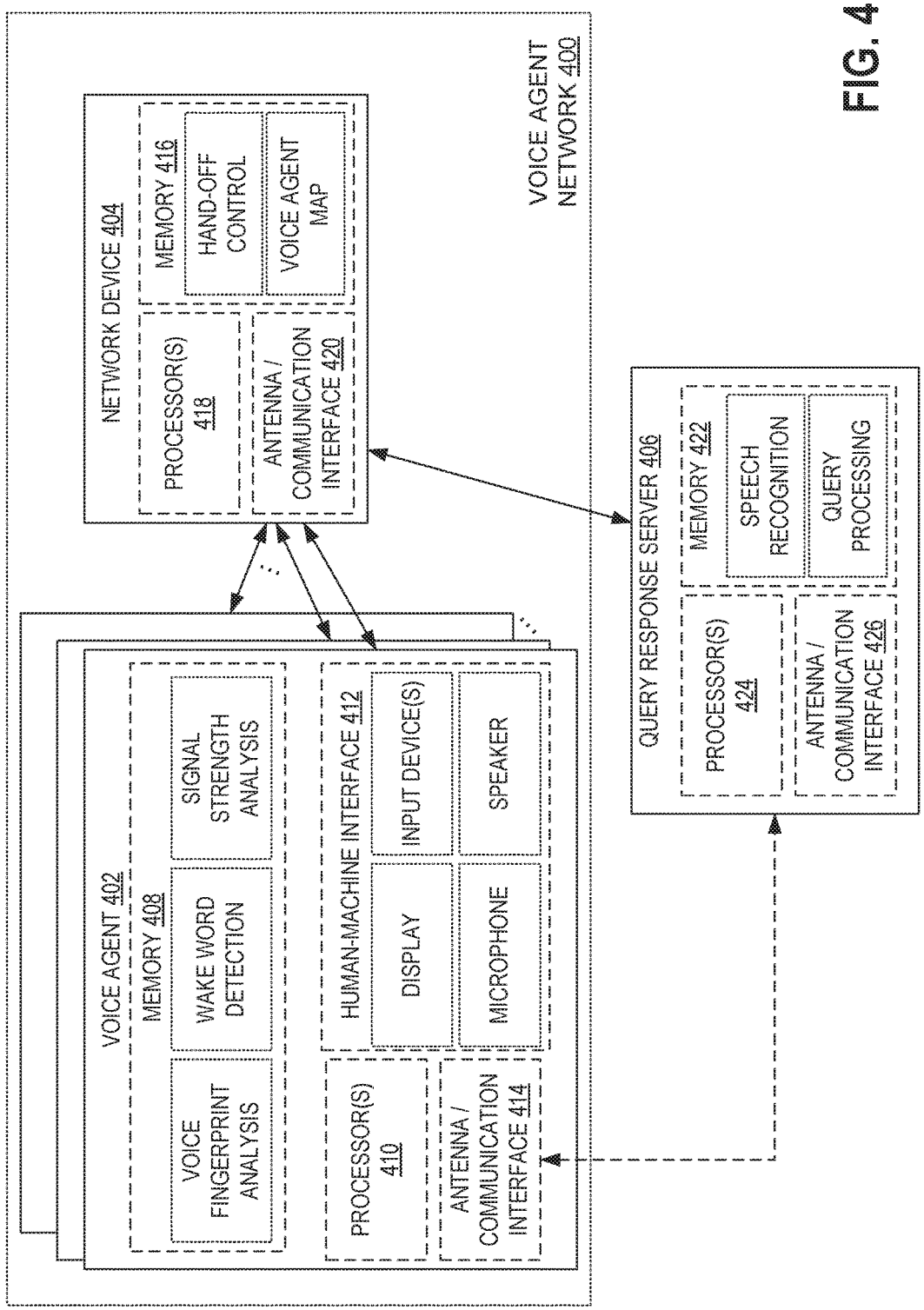
FIG. 4 shows a block diagram of an example voice agent network in accordance with one or more embodiments of the present disclosure.

FIG. 4 is a block diagram of an example voice agent network 400 and associated devices. The voice agent network 400 includes one or more voice agents 402 and a network device 404, each or any of which may be configured to communicate with a query response server 406 or other remote device. Voice agent 402 may include a memory device 408 (e.g., Random Access Memory [RAM], Read-Only Memory [ROM], flash memory, hard disk drives, and/or other hardware storage devices) storing instructions executable by a processor 410 to perform operations such as voice fingerprint analysis, wake word detection, signal strength analysis, and/or any of the operations or methods described herein. In some examples, memory 408 may include instructions for executing an operating system or other applications on the voice agent and/or instructions to control other elements of the voice agent.

Instructions may be stored on a single device and/or distributed across multiple devices, and instructions for a given operation may be organized as a module for performing that operation. For example, a voice fingerprint analysis module may include instructions executable by a processor to analyze received voice data and extract identifying components of the voice data for associating the voice data with a particular user and/or query. A wake word detection module may include instructions executable by a processor to analyze detected voice data by comparing the voice data to a known audio sample corresponding to a predefined wake word (e.g., "hey voice agent"). As described above, although referred to as a "word," the wake word may include any string of speech and/or audio tone(s) used to indicate a start of a voice input (e.g., a voice query) and to control the voice agent to start detecting and reporting detected voice data. In some examples, the wake word may additionally or alternatively include input made by a source other than a user's voice (e.g., a button actuation, gesture, etc.). In such examples, a voice fingerprint analysis and subsequent processing/transmission may be performed on a next spoken input after the alternative wake word input. A signal strength analysis module may include instructions executable by a processor to analyze detected voice data to determine a strength (e.g., a decibel level or other indicator) at which the voice data is detected.

The instructions in memory 408 may be executed in coordination with operation of other hardware elements of the voice agent, such as elements of the human-machine interface 412 and/or the antenna/communication interface 414. The human-machine interface 412 may include a microphone, speaker, optional display, and/or other input device(s) (e.g., buttons, touch sensors, dials, knobs, cameras or other sensors for gesture detection, etc.) that enable a user to interact with the voice agent. The antenna/communication interface 414 may include hardware interface elements to transmit and/or receive information from/to the voice agent. For example, the antenna/communication interface 414 may be used to communicate voice data and other information to network device 404 and/or query response server 406. In examples where the voice agents are directly connected to one another, information may be transmitted between voice agents via respective antenna/communication interfaces. The antenna/communication interface 414 may include wired (e.g., Ethernet) and/or wireless (e.g., WIFI, BLUETOOTH, Near-Field Communication, etc.) interface elements to enable associated wired or wireless communication between devices.

Network device 404 may include memory 416, processor(s) 418, and an antenna/communication interface 420, which may include similar features to those described above with respect to memory 408, processor(s) 410, and antenna/communication interface 414. In some examples, network device 404 may only serve as an intermediary data forwarding device to propagate data between devices of the voice agent network and/or to propagate data from devices of the voice agent network to remote devices (e.g., query response server 406). In such examples, memory 416 may only include instructions for handling the transmission and receipt of data (e.g., processing data so that the data may be properly transmitted, performing encapsulation, encoding, decoding, etc., scheduling data transmission, etc.). In such examples, modules such as a hand-off control module and/or a voice agent map may be stored at the voice agents 402. In other examples, the hand-off control module and/or voice agent map may be stored at the network device. The hand-off control module may include instructions executable to compare a signal strength at which voice data is received at a non-master voice agent with a reported signal strength from a master voice agent in order to determine when to hand-off control to a new master voice agent (e.g., as described above with respect to FIGS. 2A and 2B). A voice agent map may be built using ANNOUNCE data (e.g., as described above with respect to FIG. 2A) and maintained as voice agents join and leave the voice agent network. The voice agent map may include a list of all active voice agents in the voice agent network including associated identifiers for each voice agent and/or other information (e.g., a last-received communication from each voice agent, etc.).

Query response server 406 may include memory 422, processor(s) 424, and an antenna/communication interface 426, which may include similar features to those described above with respect to memory 408, processor(s) 410, and antenna/communication interface 414. Query response server 406 may be directly connected (or connected via intermediary device) to network device 404 and/or voice agents 402 in order to receive voice data corresponding to a voice query and to send a voice query response. Memory 422 may include one or more modules for processing voice data to build a voice query and generate a voice query response. For example, memory 422 may include a speech recognition module, which includes instructions executable by the processor(s) 424 to recognize speech within the raw voice data received from the voice agents. In some examples, voice agents 402 may include some rudimentary speech processing capabilities, in which case, the speech recognition module may build upon the speech processing performed by the voice agents to determine a query posed by a user. Memory 422 may also include a query processing module, which includes instructions executable by the processor(s) 424 to stitch together voice data to build a voice query, parse the voice query to determine what information is requested by the query, and generate a query response including the requested information. The query processing module may work with the speech recognition module in order to intelligently process the raw voice data and rebuild the query string.

Figure 5:
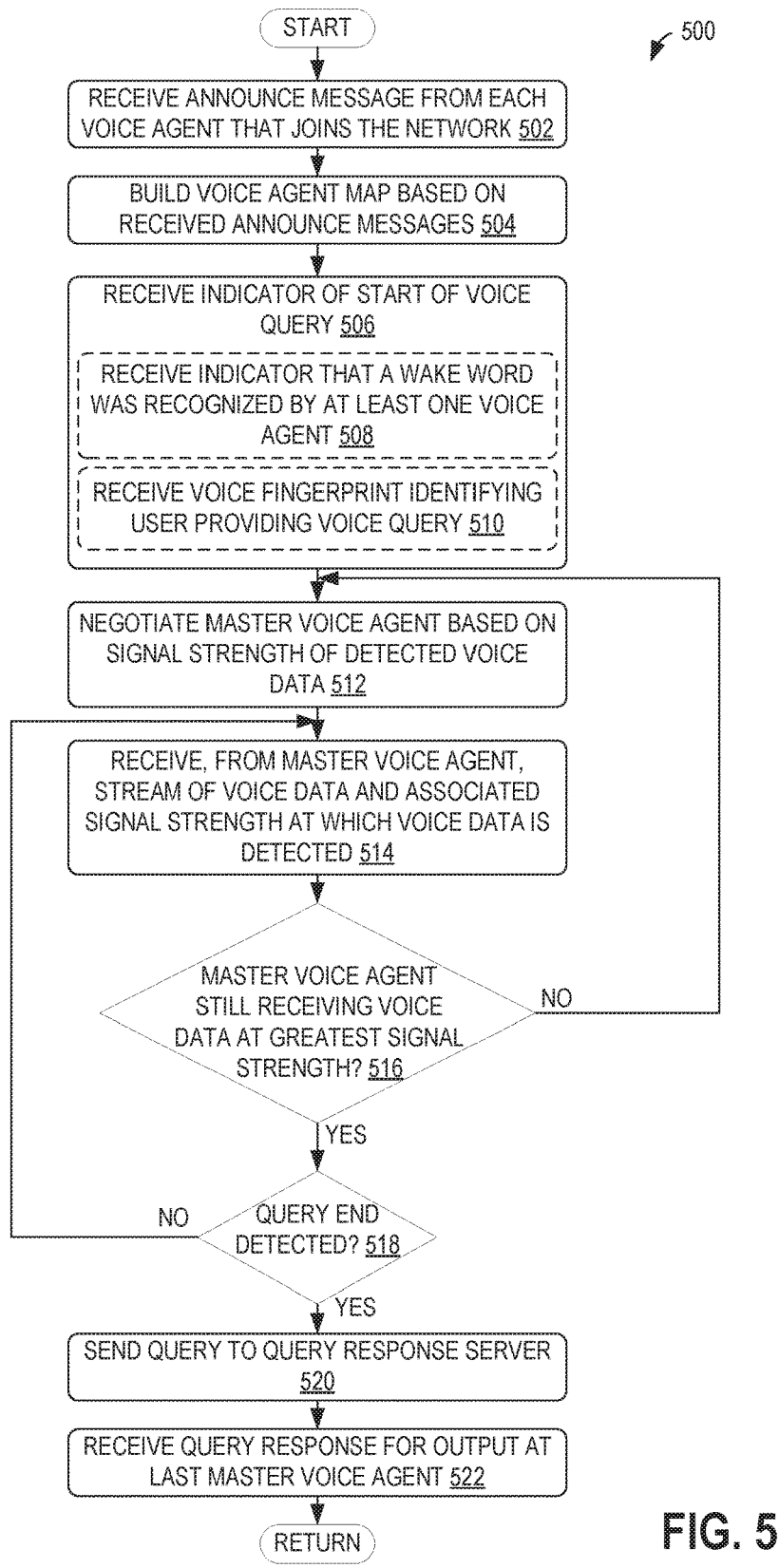
FIG. 5 is a flow chart of an example method of handling voice data in a voice agent network in accordance with one or more embodiments of the present disclosure.

FIG. 5 is a flow chart of an example method 500 for controlling the handling of voice queries in a multi-voice agent environment. For example, method 500 may be performed by one or more devices of the voice agent network 400 of FIG. 4 and/or associated devices. More particularly, method 500 may be performed by a network device, such as network device 104 of FIG. 1, network device 202 or 302 of FIGS. 2A, 2B, and 3, and/or network device 404 of FIG. 4.

At 502, the method includes receiving one or more announce messages from each voice agent that joins a network. At 504, the method includes building a voice agent map based on the received announce messages. For example, each time a voice agent joins the network and sends an announce message, identifying information for the voice agent (e.g., included in the announce message) may be added to the voice agent map to add an entry corresponding to the newly joined voice agent. In some examples, voice agents may be removed from the map responsive to an indication that the voice agents have left the network (e.g., no communication received from the voice agents for a threshold period of time, no response to requests for communication, etc.).

At 506, the method includes receiving an indicator of a start of a voice query. For example, the indicator may include a wake word that was recognized by at least one voice agent, as indicated at 508 and/or a voice fingerprint identifying a user providing a voice query, as indicated at 510. As used herein, the wake word may be received in addition to voice data corresponding to a voice input (e.g., the wake word may be a separate input from voice input such as a voice query). At 512, the method includes negotiating a master voice agent based on a signal strength of the detected voice data. For example, a first voice agent that detects the voice data may automatically be designated as a master voice agent until other voice agents report detecting the same voice query (e.g., as determined based on matching the voice fingerprint of detected voice data to the voice fingerprint indicated at 510). Once other voice agents report detecting the same voice query, the voice agent that detects the voice query at the highest signal strength may be designated as the master voice agent.

At 514, the method includes receiving a stream of voice data and associated signal strength (at which the voice data was detected) from the master voice agent. At 516, the method includes determining whether the master voice agent is still receiving voice data at the greatest signal strength (e.g., relative to the other voice agents of the network). If the master voice agent is not receiving voice data at the greatest signal strength (e.g., if another voice agent has reported a signal strength for that voice query that is greater than the signal strength reported by the master voice agent, "NO" at 516), the method returns to 512 to renegotiate the master voice agent based on the signal strength (e.g., to switch the master voice agent to the voice agent that is detecting the voice data at the highest signal strength relative to the other voice agents) and then receive voice data from the new master voice agent (e.g., at 514). If the master voice agent is still receiving voice data at a greatest signal strength (e.g., if no other voice agent has reported a signal strength for that voice query that is greater than the signal strength reported by the master voice agent, "YES" at 516), the method proceeds to 518 to determine if a query end is detected.

If a query end is not detected (e.g., "NO" at 518), the method returns to 514 to continue receiving a stream of voice data for the voice query from the master voice agent. If a query end is detected (e.g., "YES" at 518), the method proceeds to 520 to send the query to the query response server. For example, sending the query may include sending aggregated voice data collected over the course of performing method 500, or may include sending a last portion of the voice data if the portions of voice data are continuously forwarded to the query response server as the voice data is received from the master voice agent. In either case, sending the query may also include sending an indication that the query end was detected (e.g., that the query is complete). At 522, the method includes receiving the query response for output at the last master voice agent.

Figure 6:
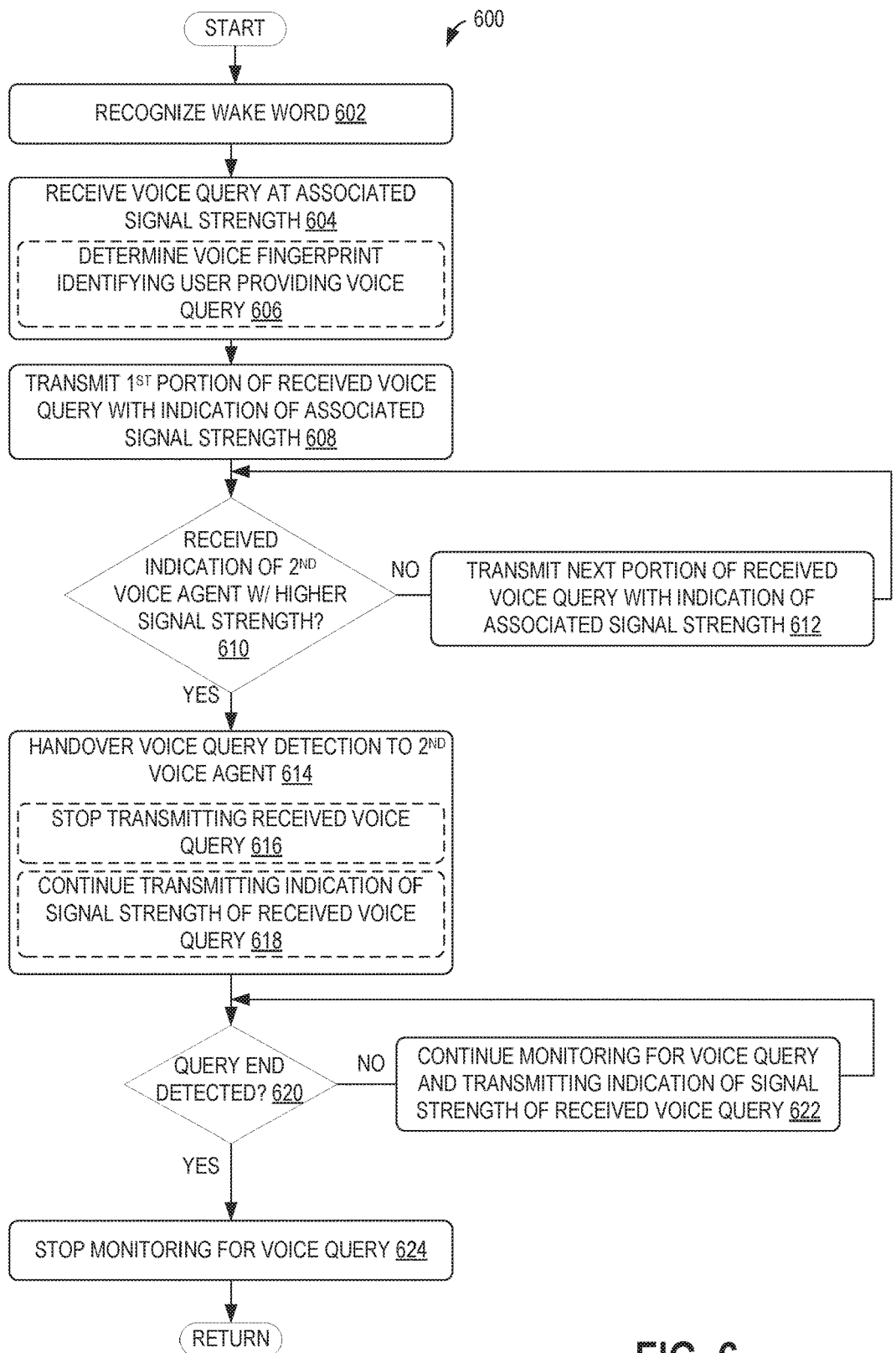
FIG. 6 is a flow chart of an example method of handing off voice agent control in a voice agent network in accordance with one or more embodiments of the present disclosure.

FIG. 6 is a flow chart of an example method 600 for handing off control of detecting a voice query. For example, method 600 may be performed by a voice agent that is designated as a master voice agent, such as any of the voice agents described above (e.g., voice agent 402 of FIG. 4). At 602, the method includes recognizing a wake word. As described above, a wake word may include any suitable sound or series of sounds that is used to control a voice agent to start listening for a voice input. In this way, the voice agent may ignore all voice input that is not the wake word until the wake word is detected. At 604, the method includes receiving the voice query at an associated signal strength. As indicated at 606, the voice query and/or the wake word may be analyzed to determine a voice fingerprint identifying the user providing the voice query and/or otherwise uniquely identifying the source of the voice query.

At 608, the method includes transmitting a first portion of the received voice query with an indication of the associated signal strength at which that portion was received. As stated above, although described in terms of "portions" for illustrative purposes, it is to be understood that the master voice agent may continuously stream voice data and associated signal strengths as the voice data is detected. At 608, the voice agent streaming the voice data may be designated as a master voice agent, such that no other voice agents are streaming any detected voice data associated with that voice query. Prior to or coincidentally with transmitting the first portion of the received voice query, the voice agent may transmit an indication of the voice fingerprint in order to allow other voice agents in the network to identify whether a detected voice query is the same as the voice query being detected by the master voice agent.

At 610, the method includes determining whether an indication of a second (different) voice agent that is detecting the voice query at a higher signal strength has been received (e.g., based on a report of signal strength received by other voice agents detecting the voice query). If an indication of a second voice agent with a higher signal strength is not received (e.g., "NO" at 610), the method processed to 612 to transmit the next portion of the received voice query with an indication of the associated signal strength, and returns to 610 to monitor whether another voice agent is reporting a higher signal strength.

If an indication of a second voice agent with a higher signal strength is received (e.g., "YES" at 610), the method proceeds to 614 to handover voice query detection to the second voice agent. As indicated at 616, the handover may include stopping transmission of the received voice query and/or continuing to transmit an indication of signal strength of the received voice query, as indicated at 618. It is to be understood that if multiple voice agents report higher signal strength than the master voice agent at 610, the master voice agent may handover voice query detection to the voice agent that reported the highest signal strength.

At 620, the method includes determining whether a query end is detected (e.g., based on a report of the query end from the master voice agent). If a query end is not detected (e.g., "NO" at 620), the method includes continuing to monitor for the voice query and selectively transmitting an indication of signal strength of the received voice query (e.g., the signal strength may be reported as long as the voice query is detected, or may only be reported when higher than a signal strength reported by the master voice agent). The method then returns to 620 to continue monitoring for a query end. It is to be understood that if, at any point during the execution of the monitoring at 622 and 620 (e.g., any point prior to the query end being detected), the signal strength of the voice agent is higher than the signal strength reported by the master voice agent, the method may return to 612, as the voice agent may be switched back to being master voice agent. If the query end is detected (e.g., "YES" at 620), the method includes stopping the voice query monitoring. For example, the voice agent may return to only monitoring for the wake word.

Figure 7:
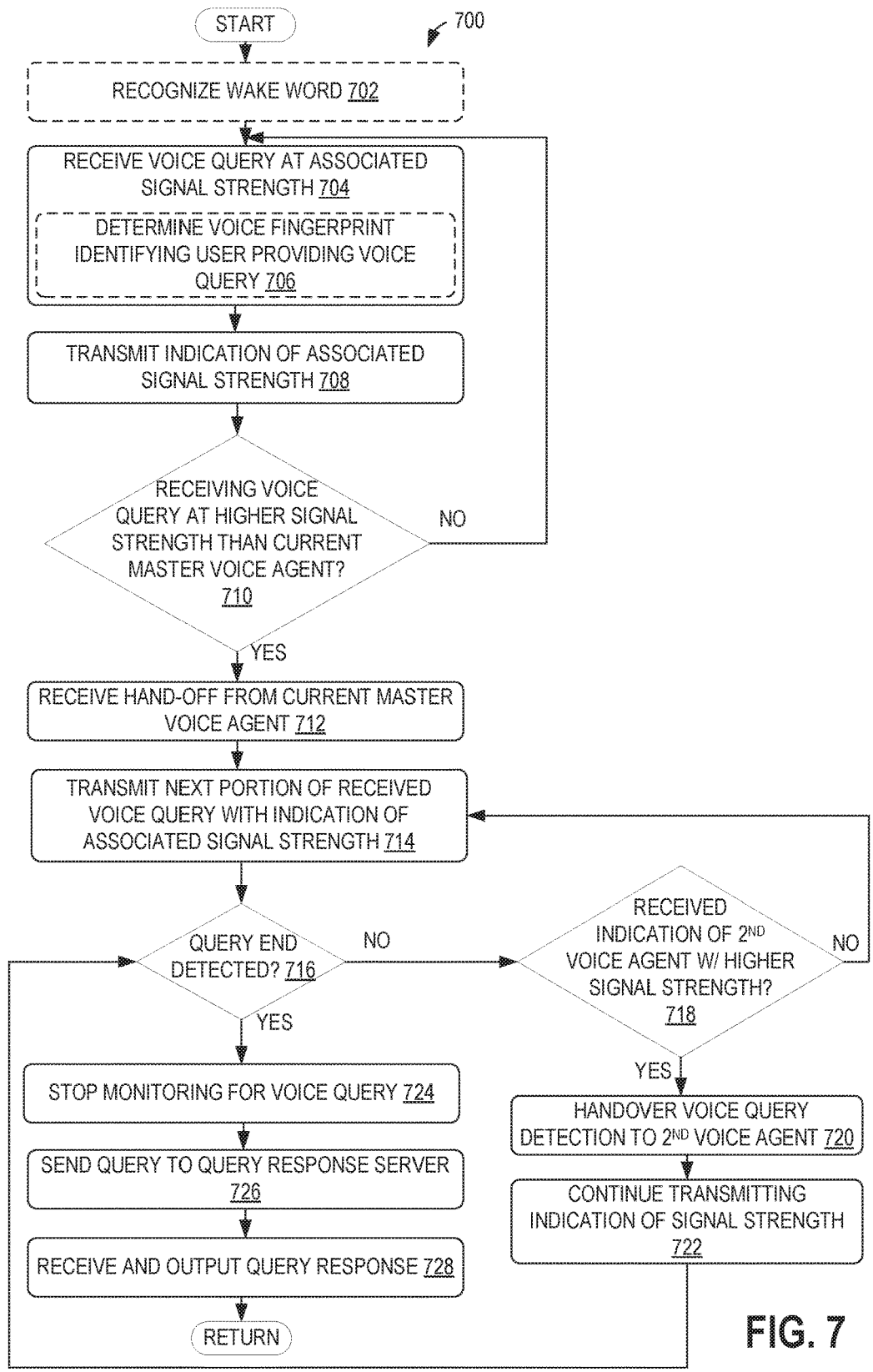
FIG. 7 is a flow chart of an example method of receiving hand-off of voice agent control in a voice agent network in accordance with one or more embodiments of the present disclosure.

FIG. 7 is a flow chart of a method 700 for receiving hand-off of control over voice query detection. For example, method 700 may be performed by a voice agent that is not designated as a master voice agent, such as any of the voice agents described above (e.g., voice agent 402 of FIG. 4). At 702, the method optionally includes recognizing a wake word. The non-master voice agent may not detect the voice query at the start of the voice query input, and thus may not recognize the wake word in some examples. In other examples, the non-master voice agent may detect the wake word, but may detect the wake word at a lower signal strength relative to another voice agent (and thus may not be designated as a master voice agent at the beginning of the voice query).

At 704, the method includes receiving the voice query at an associated signal strength. In examples where the non-master voice agent does not detect the wake word, receipt of the voice fingerprint from the master voice agent (e.g., as described at 218 of FIG. 2A, the first voice agent that detects the wake word and subsequent voice query extracts and transmits a voice fingerprint of the voice query to the other voice agents in the network for later comparison) may trigger the non-master voice agent to begin listening for voice data other than the wake word (e.g., may trigger the non-master voice agent to "wake" as if the non-master voice agent had detected the wake word). As indicated at 706, the voice fingerprint identifying the user providing the voice query may be determined while receiving the voice query and compared to a voice fingerprint transmitted by the first master voice agent for the voice query to determine a match. At 708, the method includes transmitting an indication of the associated signal strength. At 710, the method includes determining if the voice query is being received at a higher signal strength than the signal strength reported by the master voice agent. If the signal strength at which the voice agent is detecting the voice query is not higher than the signal strength last reported by the master device (e.g., "NO" at 710), the method returns to 704 to continue receiving the voice query and transmitting an indication of associated signal strength. It is to be understood that in some examples, the indication of the associated signal strength may only be transmitted when higher than a last reported signal strength from the master voice agent.

If the voice query is being received at a higher signal strength than the last reported signal strength of the master voice agent (e.g., "YES" at 710), the method proceeds to 712 to receive hand-off of voice query detection control from the current master voice agent. At 714, the method includes transmitting the next portion of the received voice query with an indication of the associated signal strength at which that portion was detected. It is to be understood that the transmission of the voice query may be immediately performed by the new master voice agent without delay (other than nominal processing delays) responsive to receiving the hand-off from the prior master voice agent.

At 716, the method includes determining if a query end is detected. If a query end is not detected (e.g., "NO" at 716), the method proceeds to 718 to determine if an indication of another voice agent with higher signal strength is received. If such an indication is not received (e.g., "NO" at 718), the method returns to 714 to continue transmitting the voice query as detected and monitoring for a query end. If an indication of another voice agent with a higher signal strength is received (e.g., "YES" at 718), the method proceeds to 720 to handover voice query detection to that other voice agent. The method may further include continuing to transmit an indication of signal strength at the voice agent (or transmitting an indication of signal strength once the signal strength is greater than that reported by the new master voice agent) at 722 and to return to 716 to continue monitoring for a query end. If a query end is detected (e.g., "YES" at 716), the method proceeds to 724 to stop monitoring for the voice query. The method includes sending the query to the query response server, as indicated at 726, and receiving and outputting the query response at 728.

Another example includes a voice agent including an audio sensor, a communication interface, a processor, and a memory device storing instructions executable by the processor to detect, via the audio sensor, first audio data corresponding to a voice input, and, responsive to determining that at least one other voice agent of a voice agent network is detecting second audio data corresponding to the voice input, determine a signal strength at which the first audio data is detected, compare the signal strength to a reported signal strength of the second audio data as received from the at least one other voice agent, and selectively transmit one or more of an indication of the signal strength of the first audio data and the detected audio data based on comparing the signal strength of the first audio data to the reported signal strength of the second audio data as received from the at least one other voice agent. In a first example of the voice agent, the instructions may additionally or alternatively be further executable to determine that at least one other voice agent is detecting audio data corresponding to the voice input by receiving a first voice fingerprint associated with the voice input from another voice agent, determining a second voice fingerprint of the audio data, and comparing the second voice fingerprint to the first voice fingerprint to determine that the second voice fingerprint matches the first voice fingerprint. A second example of the voice agent optionally includes the first example, and further includes the voice agent, wherein the instructions are further executable to stop transmitting the detected audio data responsive to receiving a reported signal strength of third audio data from a selected voice agent of the at least one other voice agent that is higher than a current signal strength at which the audio data is detected. A third example of the voice agent optionally includes one or both of the first and the second examples, and further includes the voice agent, wherein the instructions are further executable to detect an indication of an end of the voice input, and, responsive to detecting the indication of the end of the voice input, selectively transmit a message to at least a network device of the voice agent network indicating the end of the voice input. A fourth example of the voice agent optionally includes one or more of the first through the third examples, and further includes the voice agent, wherein selectively transmitting the message comprises transmitting the message if the voice agent is transmitting detected audio data upon detecting the indication of the end of the voice input and not transmitting the message if the voice agent is not transmitting detected audio data upon detecting the indication of the end of the voice input. A fifth example optionally includes one or more of the first through the fourth examples, and further includes the voice agent including an output device, wherein the instructions are further executable to selectively receive and output a response to the voice input via the output device based on whether the voice agent is transmitting detected audio data upon detecting the indication of the end of the voice input. A sixth example optionally includes one or more of the first through the fifth examples, and further includes the voice agent, wherein the instructions are further executable to start detecting the audio data corresponding to the voice input and report, to each other voice agent in the voice agent network, a signal strength at which the audio data is detected responsive to detecting a predefined wake word. A seventh example optionally includes one or more of the first through the sixth examples, and further includes the voice agent, wherein the instructions are further executable to transmit an announce message responsive to the voice agent joining the voice agent network. An eighth example optionally includes one or more of the first through the seventh examples, and further includes the voice agent, wherein selectively transmitting one or more of an indication of the signal strength and the detected audio data includes transmitting the detected audio data and the indication of the signal strength to at least a network device of the voice agent network responsive to being assigned as a master voice agent, and transmitting only the indication of the signal strength to at least a network device of the voice agent network responsive to determining that the signal strength is higher than the reported signal strength of the at least one other voice agent and that the voice agent is not currently assigned as the master voice agent.

Another example includes a method of controlling voice input detection in a voice agent network including a plurality of voice agents, the method including detecting, at a first voice agent of the plurality of voice agents, first audio data corresponding to a voice input at a first signal strength, responsive to determining that the first signal strength is higher than received signal strengths reported from each other voice agent in the voice agent network, assigning the first voice agent as a master voice agent, transmitting, from the first voice agent, a stream including the first audio data and a report of a continuously updated signal strength at which the first audio data is detected while the first voice agent is assigned as the master voice agent, and, responsive to receiving an indication that a second voice agent of the plurality of voice agents detects second audio data corresponding to the voice input at a signal strength that is higher than a currently-reported signal strength from the first voice agent, assigning the second voice agent as the master voice agent and stopping the transmission of the stream at the first voice agent. In a first example, the method may additionally or alternatively further include transmitting, from the first voice agent, a voice fingerprint identifying the voice input. A second example optionally includes the first example, and further includes the method, further including transmitting, from the first voice agent while the second voice agent is assigned as the master voice agent, a report of the current signal strength of detected audio data corresponding to the voice input only responsive to determining that the current signal strength is higher than a last reported signal strength received from the second voice agent. A third example optionally includes one or both of the first and the second examples, and further includes the method, further including detecting, while the first voice agent is assigned as the master voice agent, an indication of an end of the voice input and, responsive to detecting the indication of the end of the voice input, sending a message indicating the end of the voice input to a remote device. A fourth example optionally includes one or more of the first through the third examples, and further includes the method, wherein the voice input includes a voice query and the remote device includes a query response server, the method further comprising receiving, at the first voice agent, a response to the voice query and outputting, via an output device of the first voice agent the response to the voice query.

Another example includes a voice agent network including a plurality of voice agents, and a network device communicatively coupled to the plurality of voice agents and a query response server, a first voice agent of the plurality of voice agents including a memory device storing instructions executable by a processor of the first voice agent to detect first audio data corresponding to a voice query at a first signal strength, responsive to determining that the first signal strength is higher than received signal strengths reported from each other voice agent in the voice agent network, receive an assignment as a master voice agent, transmit a stream including the first audio data and a report of a continuously updated signal strength at which the first audio data is detected while the first voice agent is assigned as the master voice agent, and, responsive to receiving an indication that a second voice agent of the plurality of voice agents detects second audio data corresponding to the voice query at a signal strength that is higher than a currently-reported signal strength from the first voice agent, assigning the second voice agent as the master voice agent and stopping the transmission of the stream at the first voice agent. In a first example, the instructions may additionally or alternatively be further executable to transmit, from the first voice agent, a voice fingerprint identifying the voice query. A second example optionally includes the first example, and further includes the voice agent network, wherein the instructions are further executable to transmit, from the first voice agent while the second voice agent is assigned as the master voice agent, a report of the current signal strength of detected audio data corresponding to the voice query only responsive to determining that the current signal strength is higher than a last reported signal strength received from the second voice agent. A third example optionally includes one or both of the first and second examples, and further includes the voice agent network, wherein the instructions are further executable to detect, while the first voice agent is assigned as the master voice agent, an indication of an end of the voice query and, responsive to detecting the indication of the end of the voice query, send a message indicating the end of the voice input to the network device for forwarding to the query response server. A fourth example optionally includes one or more of the first through the third examples, and further includes the voice agent network, wherein the instructions are further executable to receive, at the first voice agent, a response to the voice query and output, via an output device of the first voice agent, the response to the voice query. A fifth example optionally includes one or more of the first through the fourth examples, and further includes the voice agent network, wherein the instructions are further executable to transmit an announce message responsive to the first voice agent joining the voice agent network.

Another example includes a voice agent network including a plurality of voice agents, and a network device communicatively coupled to the plurality of voice agents and a query response server, a first voice agent of the plurality of voice agents including a memory device storing instructions executable by a processor of the first voice agent to detect first audio data corresponding to a voice query at a first signal strength and a first signal quality, responsive to determining that one or both of the first signal strength and the first signal quality is higher than respective received signal strengths and signal qualities reported from each other voice agent in the voice agent network, receive an assignment as a master voice agent, transmit a stream including the first audio data and a report of a continuously updated signal strength and/or a continuously updated signal quality at which the first audio data is detected while the first voice agent is assigned as the master voice agent, and responsive to receiving an indication that a second voice agent of the plurality of voice agents detects second audio data corresponding to the voice query at one or both of a second signal strength and a second signal quality that is higher than a respective currently-reported signal strength and signal quality from the first voice agent, assigning the second voice agent as the master voice agent and stopping the transmission of the stream at the first voice agent.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the voice agents, network devices, and/or query response servers described above with respect to FIGS. 1-4. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A first voice agent comprising:
an audio sensor;
a communication interface;
a processor; and
a memory device storing instructions executable by the processor to:
  detect, via the audio sensor, first audio data corresponding to a voice input;
  transmit at least a portion of the first audio data to one or more receiving devices via the communication interface; and
  responsive to determining that a second voice agent of a voice agent network is detecting second audio data corresponding to the voice input:
    determine a first signal strength at which the first audio data is detected,
    compare the signal strength to a reported second signal strength of the second audio data as received from the second voice agent,
    responsive to determining that the reported second signal strength is greater than the first signal strength by a threshold, handing off, to the second voice agent, transmission of detected audio data corresponding to the voice input, and
    responsive to determining that the reported second signal strength is not greater than the first signal strength by the threshold, continue transmission of detected audio data corresponding to the voice input.

2. The first voice agent of claim 1, wherein the one or more receiving devices includes each voice agent of the voice agent network and/or a network device, the network device including a query response server or being in communication with the query response server.

3. The first voice agent of claim 1, wherein handing off transmission of the detected audio data corresponding to the voice input comprises stopping transmission of audio data corresponding to the voice input from the first voice agent and starting transmission of audio data corresponding to the voice input from the second voice agent.

4. The first voice agent of claim 3, wherein the first voice agent continues to transmit a selected amount of audio data or continues to transmit audio data for a selected amount of time after the second voice agent starts transmission of audio data corresponding to the voice input.

5. The first voice agent of claim 1, wherein the threshold is a function of a number of voice agents in the voice agent network.

6. The first voice agent of claim 1, wherein the threshold is a function of an arrangement of voice agents in the voice agent network.

7. The first voice agent of claim 1, wherein the threshold is a function of a size of an operating range of one or more voice agents in the voice agent network.

8. The first voice agent of claim 1, wherein the instructions are further executable to periodically transmit an announce message identifying the first voice agent to the voice agent network, the announce message configured to trigger transmission of respective announce messages from each other voice agent in the voice agent network.

9. The first voice agent of claim 1, wherein determining that the reported second signal strength is greater than the first signal strength by the threshold comprises determining that the reported second signal strength is greater than the first signal strength by the threshold for at least a predetermined period of time.

10. The first voice agent of claim 1, wherein determining that the reported second signal strength is greater than the first signal strength by the threshold comprises determining that the reported second signal strength is greater than the first signal strength and higher than a predetermined minimum signal strength.

11. A method of controlling voice input detection in a voice agent network including a plurality of voice agents, the method comprising:
detecting, at a first voice agent of the plurality of voice agents, first audio data corresponding to a voice input at a first signal strength and/or a first signal quality;
responsive to determining that the first signal strength and/or first signal quality is higher than respective received signal strengths and/or signal qualities reported from each other voice agent in the voice agent network, assigning the first voice agent as a master voice agent;

aggregating, at the first voice agent, collected voice data including the first audio data while the first voice agent is assigned as the master voice agent;

responsive to receiving an indication that a second voice agent of the plurality of voice agents detects second audio data corresponding to the voice input at a second signal strength and/or a second signal quality that is higher than a currently-determined signal strength and/or a currently-determined signal quality from the first voice agent, assigning the second voice agent as the master voice agent and stopping the aggregation of the collected voice data at the first voice agent; and responsive to receiving, at the first voice agent, an indication of an end of the voice input, transmitting the collected voice data to a network device.

12. The method of claim 11, wherein transmitting the collected voice data to the network device comprises transmitting the collected voice data to a query response server.

13. The method of claim 11, wherein the first signal quality is derived from measurements of Signal-to-Noise Ratio (SNR), an amount of echo and/or reflections, an amount of distortion, and/or an amount or rate of dropped voice data corresponding to the voice input, wherein the first signal quality increases with increasing SNR, decreases with increasing echo and/or reflections, decreases with increasing distortion, and decreases with increasing dropped data amounts or rates.

14. The method of claim 11, wherein the indication of the end of the voice input comprises a detection of a voice inflection indicating a question, a detection of a pause in voice data that is greater than a threshold, and/or a detection of a query end key word.

15. A voice agent network device comprising:
a communication interface communicatively coupled to a query response server and to a plurality of voice agents of a voice agent network;
a processor; and
a memory device storing instructions executable by the processor to:
receive a respective announce message from each voice agent that joins the voice agent network;
build and maintain a voice agent map using announce data from the respective announce message received from each voice agent that joins the voice agent network, wherein maintaining the voice agent map further includes removing selected voice agents from the map responsive to an indication that the selected voice agents have left the voice agent network;
receive an indicator of a start of a voice query from one or more active voice agents of the voice agent network, the one or more active voice agents including voice agents that detect the start of the voice query;
determine and designate a first voice agent of the one or more active voice agents as a master voice agent based on a comparison of respective signal strengths at which each of the one or more active voice agents are detecting voice data corresponding to the voice query; and
receive voice data corresponding to the voice query from the designated master voice agent.

16. The voice agent network device of claim 15, wherein the instructions are further executable to receive a reported signal strength from a second, non-master voice agent of the voice agent network, and switch the designation of the master agent from the first voice agent to the second voice agent responsive to determining that the reported signal strength from the second voice agent is greater than a currently reported signal strength from the master voice agent, the voice data corresponding to the voice query from the designated master voice agent being received from the second voice agent after switching the designation of the master voice agent from the first voice agent to the second voice agent.

17. The voice agent network device of claim 15, wherein the instructions are further executable to receive an indication of an end of the voice query and, responsive to receiving the indication of the end of the voice query, send a message to the query response server corresponding to the voice query.

18. The voice agent network device of claim 17, wherein the instructions are further executable to receive a response to the voice query from the query response server, and transmit to the master voice agent from which the indication of the end of the voice query is received, the response to the voice query.

19. The voice agent network device of claim 15, wherein the voice agent map includes a list of all voice agents in the voice agent network including associated identifiers for each voice agent and a last-received communication from each voice agent.

20. The voice agent network device of claim 15, wherein the instructions are further executable to stitch together received voice data corresponding to the voice query to build a reconstructed voice query, parse the reconstructed voice query to determine requested information that is being requested by the voice query, and generate a query response including the requested information.

* * * * *